(12) United States Patent
Maeda (10) Patent No.: US 12,555,848 B2
(45) Date of Patent: Feb. 17, 2026

(54) BATTERY

(71) Applicant: TOYOTA JIDOSHA KABUSHIKI KAISHA, Toyota (JP)

(72) Inventor: Takamasa Maeda, Obu (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 657 days.

(21) Appl. No.: 17/941,564

(22) Filed: Sep. 9, 2022

(65) Prior Publication Data

US 2023/0120632 A1  Apr. 20, 2023

(30) Foreign Application Priority Data

Oct. 15, 2021 (JP) ................. 2021-169416

(51) Int. Cl.
*H01M 50/102* (2021.01)
*H01M 10/0525* (2010.01)
*H01M 50/545* (2021.01)

(52) U.S. Cl.
CPC ..... *H01M 50/102* (2021.01); *H01M 10/0525* (2013.01); *H01M 50/545* (2021.01)

(58) Field of Classification Search
CPC ............. H01M 50/102; H01M 50/545; H01M 10/0525
See application file for complete search history.

(56) References Cited

U.S. PATENT DOCUMENTS

2012/0141850 A1† 6/2012 Jeong
2013/0130099 A1† 5/2013 Lee
2017/0279089 A1  9/2017 Nishino
2018/0151853 A1* 5/2018 Mitsuhashi .......... H01M 50/119
2021/0242522 A1† 8/2021 Daub
2023/0155260 A1* 5/2023 Sasaki ................. H01M 50/171
　　　　　　　　　　　　　　　　　　　　　　　429/179

FOREIGN PATENT DOCUMENTS

| JP | 2000-100396 A | | 4/2000 | |
| JP | 2000-100896 | † | 4/2000 | |
| JP | 2006-164784 A | | 6/2006 | |
| JP | 2015-85433 | † | 5/2015 | |
| JP | 2015-095433 A | | 5/2015 | |
| JP | 2017-174555 A | | 9/2017 | |
| JP | 2019153504 A | * | 9/2019 | |
| JP | 2020-107408 A | | 7/2020 | |
| JP | 2022-063578 A | | 4/2022 | |
| WO | WO-2021157731 A1 | * | 8/2021 | ............. H01G 11/10 |

* cited by examiner
† cited by third party

*Primary Examiner* — Allison Bourke
*Assistant Examiner* — Kayla Elaine Clary
(74) *Attorney, Agent, or Firm* — Dinsmore & Shohl LLP (57) ABSTRACT

To provide a battery that can prevent a gap from being generated at a joined portion to prevent structural reliability from being reduced, the battery includes: a battery element that is a hexahedron as a whole; and a package including a laminate sheet and side face members, the battery element being sealed in the package, the laminate sheet covering four faces of the hexahedron of the battery element, having at least one joined portion of end parts thereof to form a tube, the side face members facing other two faces of the hexahedron of the battery element, and being arranged to cover openings of the tube of the laminate sheet, wherein each of the side face members is a hexahedron as a whole, and has a protrusion at a portion thereof which is located at the joined portion of the laminate sheet.

6 Claims, 9 Drawing Sheets

BATTERY

FIELD

The present disclosure relates to a battery comprising a battery element and a package that includes a laminate sheet: the battery element is arranged inside and sealed in the package.

BACKGROUND

Patent Literature 1 discloses a cell comprising a laminate exterior body that has one or more flat laminate sheet(s) and two concave laminate sheets: the entire outer perimeters of the concave laminate sheets rise from the bottom to form concave shapes.

CITATION LIST

Patent Literature

Patent Literature 1: JP 2017-174555 A

SUMMARY

Technical Problem

When the shape of each side face of the package (laminate exterior body) is changed to a quadrilateral (shape and size similar to a side face of a battery element) from a hexagonal as in Patent Literature 1 in order to improve structural efficiency (the proportion of the battery element to the package in volume), an approximately triangular gap is generated at the joined portion(s) of the end parts of the laminate sheets and side face members, which reduces structural reliability (how difficult leakage and/or any problems caused by deterioration over time occur).

In view of the above problem, an object of the present disclosure is to provide a battery including a laminate sheet which can prevent a gap from being generated at any joined portion to prevent structural reliability from being reduced.

Solution to Problem

As one means for solving the above problem, the present application discloses a battery comprising: a battery element that is a hexahedron as a whole; and a package including a laminate sheet and side face members, the battery element being sealed in the package, the laminate sheet covering four faces of the hexahedron of the battery element, having at least one joined portion of end parts thereof to form a tube, the side face members facing other two faces of the hexahedron of the battery element, and being arranged to cover openings of the tube of the laminate sheet, wherein each of the side face members is a hexahedron as a whole, and has a protrusion at a portion thereof which is located at the joined portion of the laminate sheet.

The side face members may be electrically connected to the battery element to function as external terminals.

The joined portion may be provided at a position closer to one of front and back faces of the battery element than another one of the front and back faces.

Advantageous Effects

According to the battery of the present disclosure, the side face members have the protrusions at portions thereof located at the joined portion of the end parts of the laminate sheet, which can prevent a gap from being generated at the joined portion to prevent structural reliability from being reduced.

BRIEF DESCRIPTION OF DRAWINGS

FIG. 4 is a side view focusing on the surroundings of a joined portion 13a;
FIG. 5 is an exploded perspective view focusing on the surroundings of the joined portion 13a.

DESCRIPTION OF EMBODIMENTS

1. First Embodiment

Figure 1:
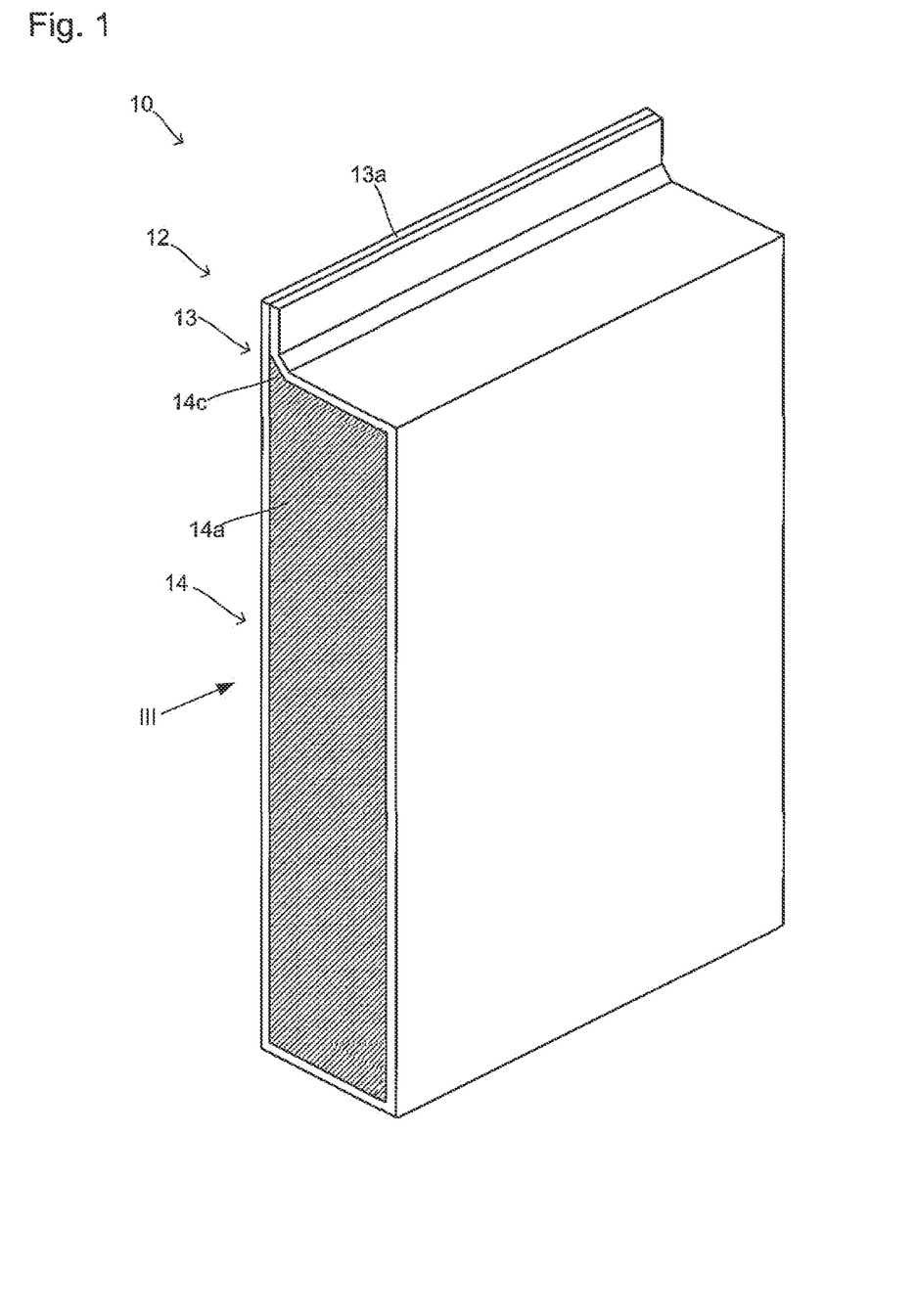
FIG. 1 is an external perspective view of a battery 10.
Figure 2:
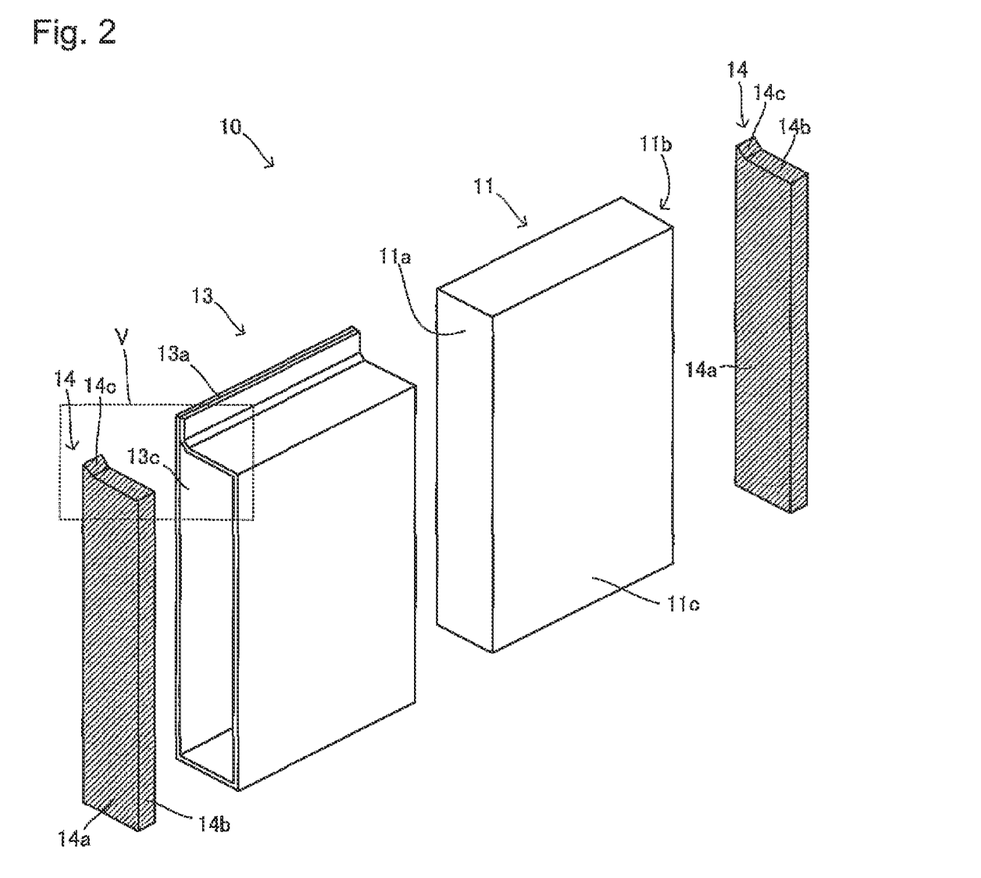
FIG. 2 is an exploded perspective view of the battery 10.
Figure 3:
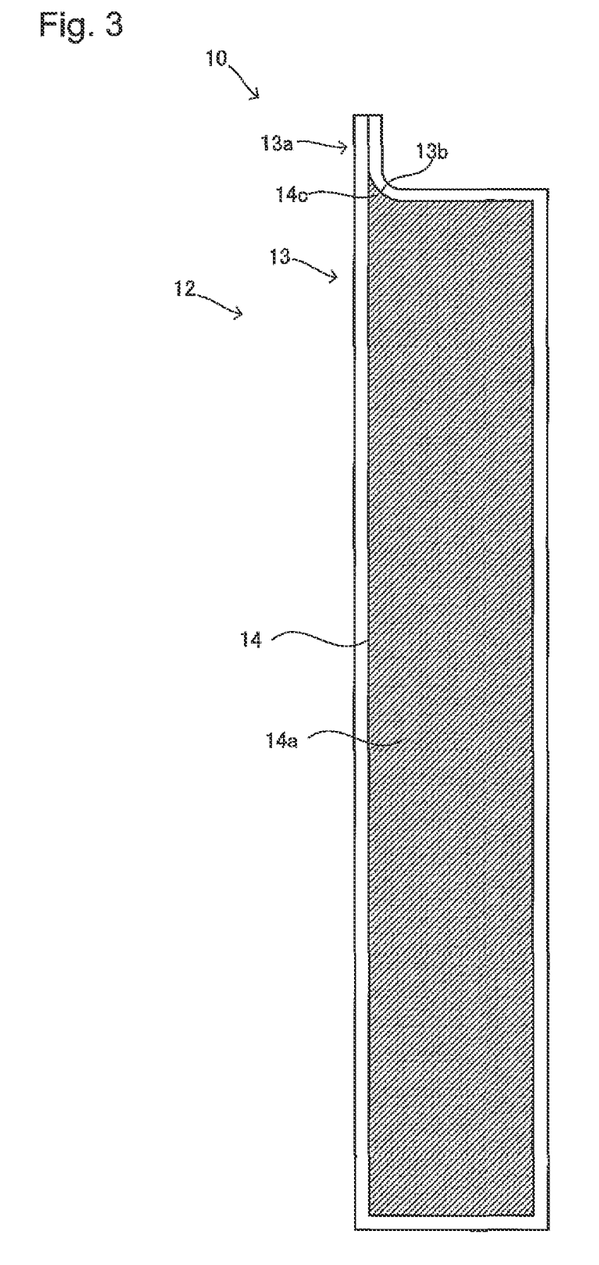
FIG. 3 is a side view of the battery 10.
Figure 4:
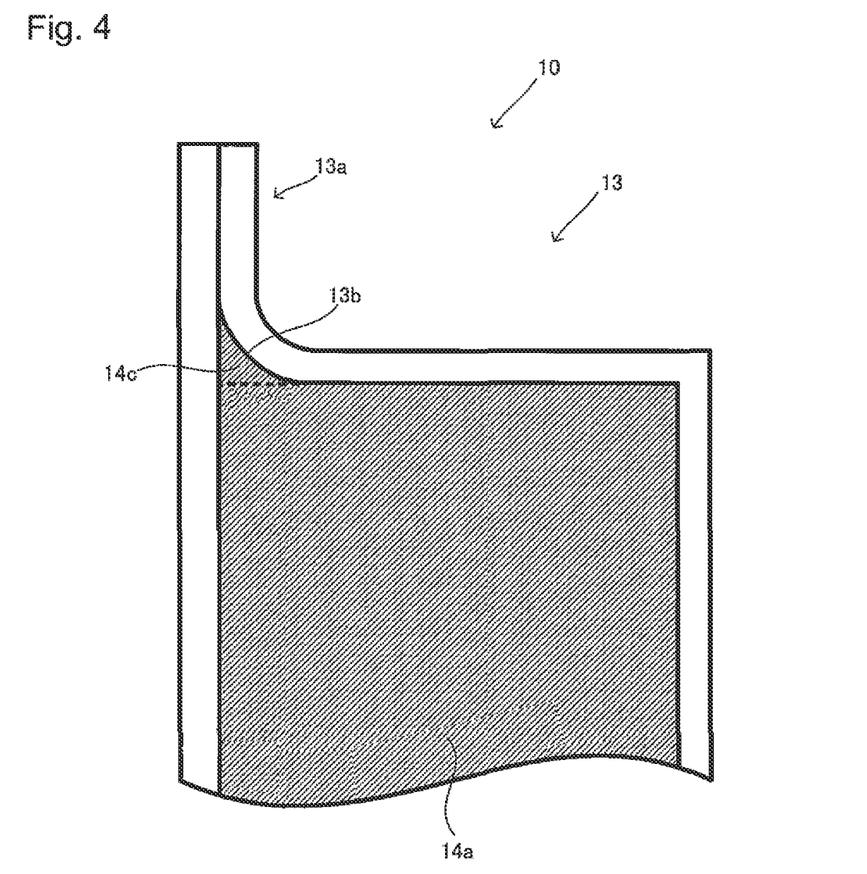
Figure 5:
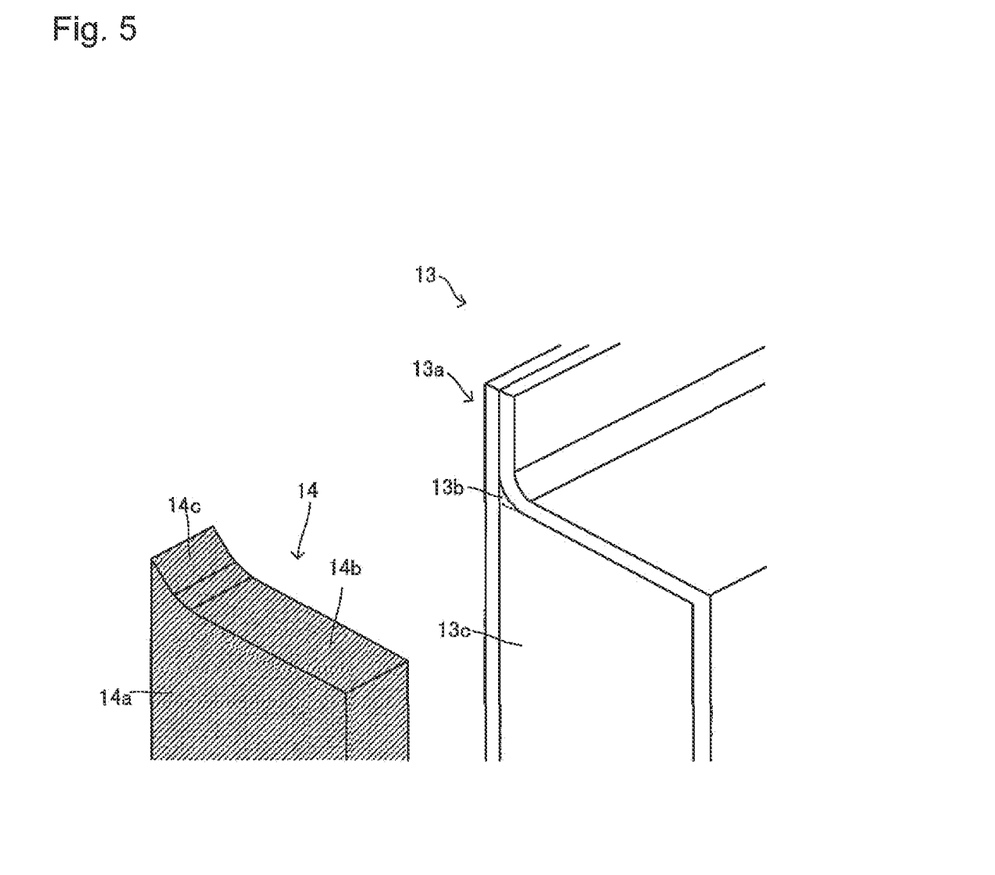

FIGS. 1 to 5 illustrate the structure of a battery 10 according to the first embodiment. FIG. 1. is an external perspective view of the battery 10, FIG. 2 is an exploded perspective view of the battery 10, FIG. 3 is a side view of the battery 10 (viewed in the direction indicated by the arrow III of FIG. 1), FIG. 4 is an enlarged view of a joined portion 13a of a laminate sheet in FIG. 3 (top end part of FIG. 3), and FIG. 5 is an enlarged view of the portion surrounded as indicated by V in FIG. 2.

As can be seen from these drawings, the battery 10 according to this embodiment comprises a battery element 11, and a package 12 in which the battery element 11 is included and sealed.

1.1. Battery Element

A known battery element may be applied as the battery element 11. Examples of the battery element 11 include an all-solid-state battery and a liquid-based battery. When being an all-solid-state battery, the battery element 11 comprises plural piled stacks each having a cathode current collector, a cathode active material layer, a solid electrolyte layer, an anode active material layer and an anode current collector in this order. When being a liquid-based battery, the battery element 11 comprises a cathode current collector, a cathode active material layer, a separator, an anode active material layer and an anode current collector which are impregnated with an electrolytic solution.

For example, any metal may be applied as the cathode current collector and the anode current collector. Examples of the metal include silver, copper, gold, aluminum, nickel, iron, stainless steel and titanium, and alloys thereof. When the battery element is a lithium ion battery, in view of chemical stability, the material of the cathode current collector is preferably aluminum and the material of the anode current collector is preferably copper.

None of the cathode active material layer, the solid electrolyte layer and the anode active material layer are particularly limited as long as the battery element has the structure having a function as a battery. For example, when the battery element is a lithium ion battery, the cathode active material layer may have lithium cobaltate as a cathode active material, the solid electrolyte layer may have $Li_2S$—

$P_2S_5$ as a sulfide solid electrolyte, and the anode active material layer may have graphite as an anode active material.

The battery element 11 as a whole has a shape of a rectangular parallelepiped (hexahedron), and the largest two faces are formed as front and back faces thereof (11c) (FIG. 2 shows one face only). The battery element 11 has four side faces that stretch between the front and back faces to form the thickness thereof.

Here, "(t)he battery element 11 as a whole has a shape of a rectangular parallelepiped (hexahedron)" means that the element is not necessary to be a rectangular parallelepiped strictly, but is in the form that seems to be a rectangular parallelepiped (hexahedron) as a whole. That is, the element may have concavities and/or convexities caused by protrusion of some necessary member from the side, front and/or back face(s) thereof.

In the present embodiment, the battery element 11 is provided with current collector tabs (not shown) at faces 11a and 11b which face side face members 14 described later (the face 11b cannot be seen in FIG. 2 because entering a blind spot) among the four side faces of the hexahedron, which is a rectangular parallelepiped. The face 11a and the face 11b are opposite to each other.

The current collector tabs include a cathode current collector tab and an anode current collector tab as known. In the present embodiment, the face 11a is provided with the cathode current collector tab and the face 11b is provided with the anode current collector tab. The current collector tabs are electrically connected to the battery element. The cathode current collector tab is a member having the function of electrically connecting the battery element and the outside on the cathode side, and the anode current collector tab is a member having the function of electrically connecting the battery element and the outside on the anode side. The material constituting the cathode current collector tab and the anode current collector tab at least has electroconductivity, and is preferably a metal. Examples of the material include silver, copper, gold, aluminum, nickel, iron, stainless steel and titanium, and alloys thereof.

Thereby, in the present embodiment, as described later, the current collector tabs are electrically connected to the side face members 14 of the package 12, and the side face members 14 can function not only as sealing means but also as connection terminals to the outside.

1.2. Package

The package 12 is a member which is in the form of a bag and in which the battery element 11 is included and sealed. In the present embodiment, the package 12 comprises a laminate sheet 13 and the side face members 14.

1.2a. Laminate Sheet

In the present embodiment, the laminate sheet 13 is a tubular member that surrounds, as making a round, the front and back faces 11c, and the two side faces other than the face 11a and the face 11b in the outer surface of the battery element 11, which is a hexahedron as a whole. The end parts of the laminate sheet 13 are joined to each other at the joined portion 13a.

Here, the laminate sheet is a sheet having a metal layer and a sealant layer. Examples of the metal etc. used for the laminate sheet include aluminum and stainless steel. Examples of the material used for the sealant layer include polypropylene, polyethylene, polystyrene, and polyvinyl chloride which are thermoplastic resins.

The way of joining the laminate sheet is not particularly limited, but any known way may be used therefor. Specific examples of the way include ways of: welding parts of the sealant layer of the laminate sheet to each other (such as hot plate welding, ultrasonic welding, vibration welding and laser welding); and adhering with an adhesive.

The laminate sheet 13 according to the present embodiment has a shape of surrounding the front and back faces 11c and the two side faces in the outer surface of the battery element 11 as making a round along the part of the outer surface of the battery element 11 which corresponds to the front and back faces 11c and the two side faces. Thus, when the laminate sheet 13 is viewed from a side where the laminate sheet 13 does not surround the battery element 11, as can be seen from FIGS. 1 and 3, the laminate sheet 13 is in the form of a quadrangular frame rimming the battery element 11 along the outer periphery of the battery element 11.

In the present embodiment, the laminate sheet 13 surrounds the outer surface of the battery element 11 as making a round as described above, and the end parts thereof are joined to each other at the joined portion 13a. As can be seen from FIGS. 1 to 5, at the joined portion 13a according to the present embodiment, faces on the battery element 11 side among the faces of the laminate sheet 13 are made to face each other to be joined to each other.

The position of the joined portion 13a is preferably closer to one of the front and back faces 11c of the battery element 11 than the other. As shown in FIGS. 3 to 5 by the reference sign 13b, a concave gap 13b is generated on the base side of the joined portion 13a. In the present embodiment, the position of the joined portion 13a is closer to one of the front and back faces 11c of the battery element 11 than the other, which can make the gap 13b small.

1.2b. Side Face Members

In the present embodiment, the two side face members 14, which are members of rectangular parallelepipeds in the form of blocks as a whole, are provided. In each of the side face members 14, front and back faces 14a that are the largest in the six faces of the rectangular parallelepiped as a whole have approximately the same shapes and sizes as the face 11a and the face 11b, which are two remaining side faces of the battery element 11 which are not surrounded by the laminate sheet 13. One of the front and back faces 14a in one of the side face members 14 is arranged so as to face the face 11a, and one of the front and back faces 14a in the other side face member 14 is arranged so as to face the face 11b.

The side face members 14 are inserted into openings 13c of the laminate sheet 13, which makes a round and in the form of a tube (see FIGS. 2 and 5), and side faces 14b thereof are joined to the inner peripheral face of the laminate sheet 13. The joining way is not particularly limited, but examples thereof include ways with an adhesive.

Here, each of the side face members 14 according to the present embodiment is provided with a protrusion 14c at part of the side face 14b. These protrusions 14c each have a shape that allows the protrusions 14c to be disposed at a position where the gap 13b of the joined portion 13a of the laminate sheet 13 is located so as to enter and fill the gap 13b when the side face members 14 are combined with the laminate sheet 13.

In the present embodiment, the side face members 14 are combined with the laminate sheet 13 as described above as one component of the package 13, and then, have the function of including and sealing the battery element 11 therein, and also function as terminals electrically connecting the battery element 11 and the outside. Therefore, in the present embodiment, each of the side face members 14 at least partially has an electroconductive member (such as copper and a copper alloy), and the electroconductive members are electrically connected to the current collector tabs provided at the face 11a and the face 11b of the battery element 11.

1.3. Effect Etc.

According to the battery of the present disclosure, the side face members have the protrusions at portions thereof to be located at the joined portion of the laminate sheet, which makes it possible to fill the gap generated at the joined portion, to suppress generation of gaps as the package, and to improve structural reliability.

In the present disclosure, compared with a hexagonal package in a side view like Patent Literature 1, the package is along the shape of the battery element, which can prevent wasted spaces from being generated in the package, to improve structural efficiency. This also means that the total length of the joined portion in the package can be shortened. The structural reliability can be improved also in such a view.

In the present embodiment, because the side face members, which are members forming the package, also serve as connection terminals to the outside, the structure of the battery including a laminate sheet can be simplified.

2. Second Embodiment

Figure 6:
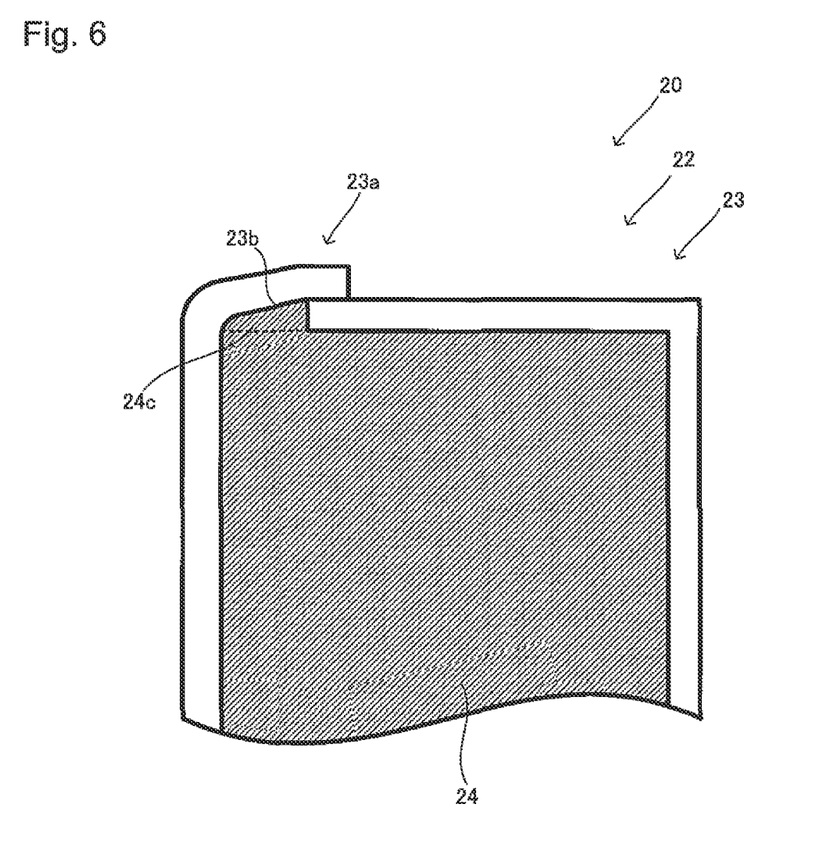
FIG. 6 illustrates a battery 20.

FIG. 6 illustrates the structure of a battery 20 according to the second embodiment. This drawing is viewed from the same viewpoint as FIG. 4.

In the battery 20, a laminate sheet 23 and side face members 24 are applied in the package 22. In the battery 20, a joined portion 23a has a shape different from the joined portion 13a, and, correspondingly to this, protrusions 24c of the side face members 24 have shapes different from the protrusions 14c. The concept of the battery 20 is, however, the same as the battery 10.

At the joined portion 23a of the laminate sheet 23, one and the other end portions of the laminate sheet 23 are superposed onto and joined to each other as an inside face of the one end portion (face on the battery element side) and an outside face of the other end portion (face on the side exposing to the outside) face each other. This causes an approximately triangular gap 23b to be generated inside (on the battery element side of) the joined portion 23a.

The joined portion 23a in the present embodiment is also closer to one of the front and back faces of the battery element than the other. This can make the size of the gap 23b to be generated, to be small.

The protrusions 24c having sizes and shapes that allow the protrusions 24c to fill the gap 23b are provided at portions of the side face members 24 which are to be located at the gap 23b.

Such a battery 20 also brings about the same effect as the battery 10.

3. Third Embodiment

Figure 7:
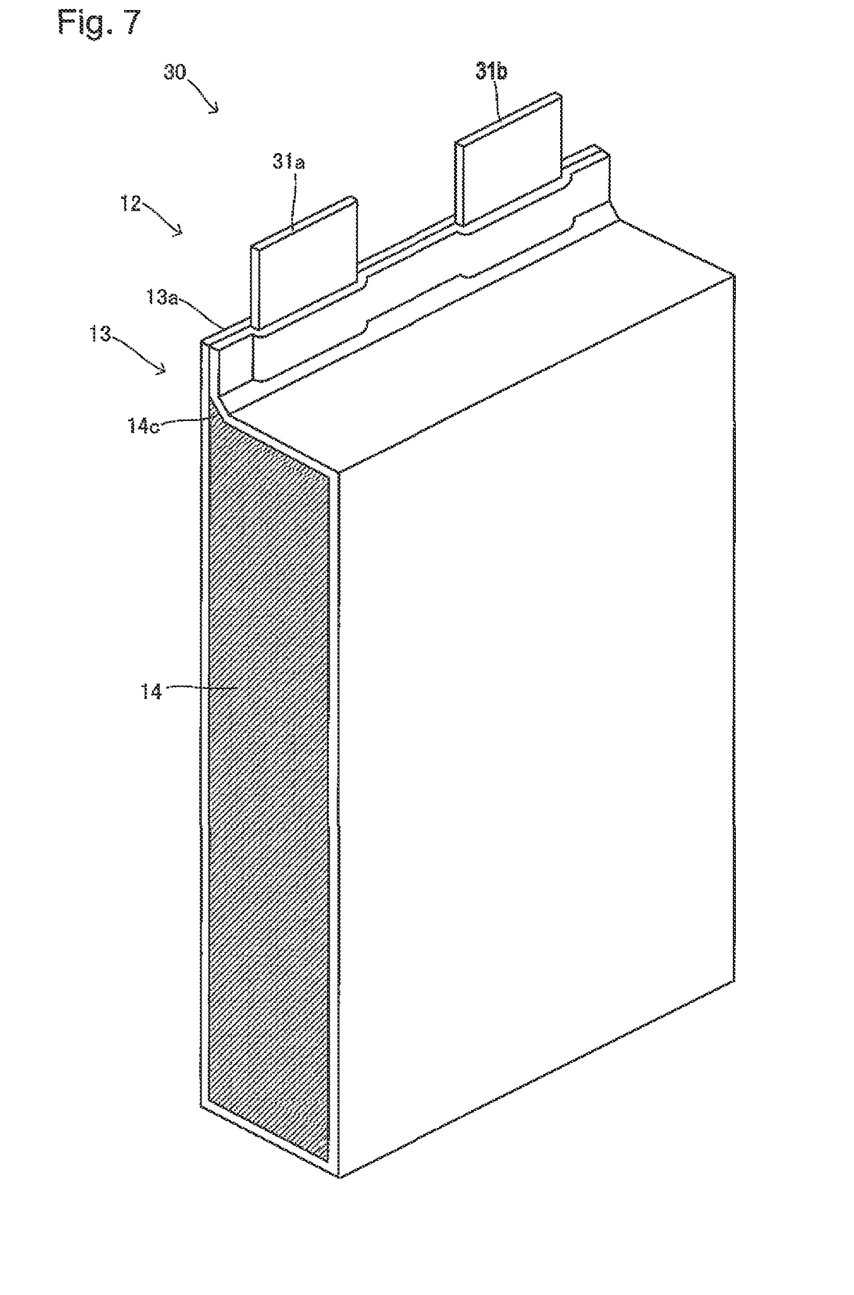
FIG. 7 is an external perspective view of a battery 30.
Figure 8:
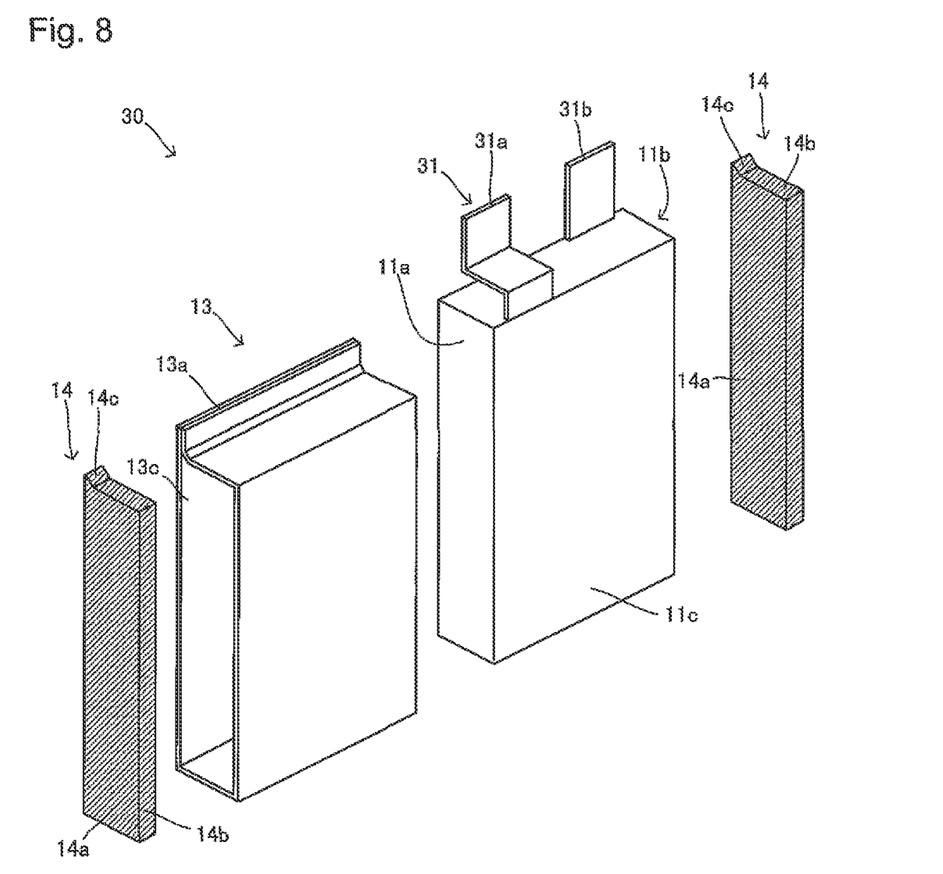
FIG. 8 is an exploded perspective view of the battery 30.

FIGS. 7 and 8 illustrate the structure of a battery 30 according to the third embodiment. FIG. 7 is an external perspective view of the battery 30, and FIG. 8 is an exploded perspective view of the battery 30.

The battery 30 is provided with a battery element 31 instead of the battery element 11 provided for the battery 10. The other components of the battery 30 may be considered the same as those in the battery 10 except the following description.

In the present embodiment, the battery element 31 includes a current collector tab 31a and a current collector tab 31b extending in the direction of the joined portion 13a of the package 12 and penetrating the joined portion 13a to expose to the outside, and thereby, forming terminals that allow external connection. Therefore, in this embodiment, the side face members 14 of the package 12 at least have the function of sealing the package 12 only. Thus, the side face members 14 are not necessary to include an electroconductive material, and the whole thereof may be formed of a resin such as polypropylene, polyethylene, polystyrene, and polyvinyl chloride which are thermoplastic resins.

Such a battery 30 also brings about the same effect as the battery 10 except that the side face members 14 do not serve as external terminals.

4. Fourth Embodiment

Figure 9:
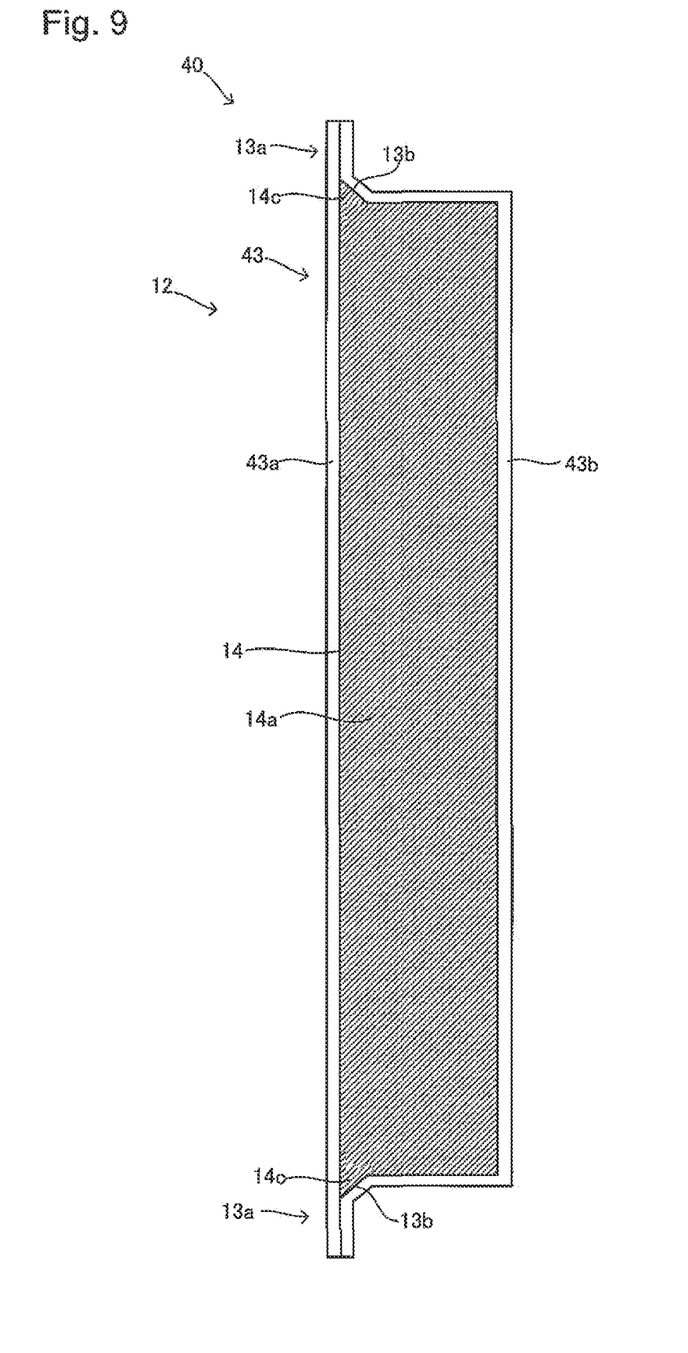
FIG. 9 is a side view of a battery 40.

FIG. 9 illustrates the structure of a battery 40 according to the fourth embodiment. This drawing is viewed from the same viewpoint as FIG. 3.

In the battery 40, a laminate sheet 43 comprises a sheet 43a and a sheet 43b that are connected to each other. Like this, the laminate sheet may comprise plural sheets. In this case, the battery 40 has a plurality of the joined portions 13a. However, the joined portions, and the protrusions 14c of the side face members 14 corresponding thereto may be considered the same as those in the battery 10.

In such a battery 40, the battery element can be covered by putting the battery element between the two sheets although the number of the joined portions increases.

The battery 40 brings about the same effect as the battery 10 concerning the other points.

REFERENCE SIGNS LIST 10 battery
11 battery element
12 package
13 laminate sheet
13a joined portion
13b gap
14 side face member
14c protrusion

What is claimed is:
1. A battery comprising:
a battery element that is a hexahedron as a whole; and
a package including:
  a laminate sheet; and
  side face members,
wherein:
  the battery element is sealed in the package;
  the laminate sheet covers four faces of the hexahedron of the battery element and two faces of the hexahedron of the battery element are entirely not covered by the laminate sheet;
  the laminate sheet comprises at least one joined portion where end parts of the laminate sheet are joined together to form a tube with openings at the two faces of the hexahedron of the battery element that are not covered by the laminate sheet;

the side face members are arranged to cover the openings of the tube of the laminate sheet;

each of the side face members:
is a hexahedron as a whole, the hexahedron of the side face members comprising six faces;
comprises front and back faces that are the largest of the six faces of the hexahedron of the side face member; and
has a protrusion at a portion thereof which is located at the joined portion of the laminate sheet; and one of the front or back faces of each side face member faces one of the two faces of the hexahedron of the battery element that are not covered by the laminate sheet.

2. The battery according to claim 1, wherein the side face members are electrically connected to the battery element, and function as external terminals.

3. The battery according to claim 1, wherein the joined portion is provided at a position closer to one of front and back faces of the battery element than another one of the front and back faces.

4. The battery according to claim 1, wherein:

the laminate sheet comprises:
a battery element side, a portion of which faces toward the battery element; and
a side opposite the battery element side that faces away from the battery element;

and the joined portion of end parts of the laminate sheet on the battery element side that face each other and are joined together.

5. The battery according to claim 1, wherein the front and back faces of each side face member have approximately the same shape as the two faces of the hexahedron of the battery element that are not covered by the laminate sheet.

6. The battery according to claim 1, wherein the protrusions of the side face members are disposed at a position where a gap of the joined portion of the laminate sheet is located so as to enter and fill the gap when the side face members are combined with the laminate sheet.

* * * * *